United States Patent
Bernhard et al.

(10) Patent No.: US 6,361,307 B1
(45) Date of Patent: Mar. 26, 2002

(54) DOUGH LUMP SHAPER

(75) Inventors: Frédéric Bernhard, Sermoise; François Garcia, Urzy, both of (FR)

(73) Assignee: Electrolux Baking, Cagnes sur Mer (FR)

( * ) Notice: Subject to any disclaimer, the term of this patent is extended or adjusted under 35 U.S.C. 154(b) by 0 days.

(21) Appl. No.: 09/856,854

(22) PCT Filed: Sep. 25, 2000

(86) PCT No.: PCT/FR00/02646
§ 371 Date: May 25, 2001
§ 102(e) Date: May 25, 2001

(87) PCT Pub. No.: WO01/22824
PCT Pub. Date: Apr. 5, 2001

(30) Foreign Application Priority Data

Sep. 27, 1999 (FR) .............................. 99 12006

(51) Int. Cl.$^7$ .............................. A21C 3/00; A21C 3/02; A21C 3/06; A21C 7/01; A23L 1/00
(52) U.S. Cl. .................. 425/193; 99/450.1; 99/494; 425/321; 425/335; 425/337; 425/363; 425/372; 425/374
(58) Field of Search .................. 99/494, 450.1–450.8; 425/151, 193, 321, 335, 337, 363, 372, 374, 302.1, 371, 364 R

(56) References Cited

U.S. PATENT DOCUMENTS

| | | | | |
|---|---|---|---|---|
| 2,249,307 A | * | 7/1941 | Battiste | .................. 425/321 |
| 2,746,401 A | * | 5/1956 | Archer | .................. 99/450.1 X |
| 3,368,502 A | * | 2/1968 | Elgner | .................. 425/337 |
| 4,036,569 A | * | 7/1977 | Oshikiri | .................. 425/337 |
| 4,266,920 A | * | 5/1981 | Hayashi et al. | .................. 425/337 |
| 4,966,071 A | * | 10/1990 | Willett | .................. 99/450.1 |
| 4,996,915 A | * | 3/1991 | Morikawa et al. | .......... 425/335 |
| 5,538,414 A | * | 7/1996 | Kobayashi et al. | .......... 425/335 |

FOREIGN PATENT DOCUMENTS

| | | |
|---|---|---|
| EP | 0 898 891 A | 3/1999 |
| EP | 0 914 769 | 5/1999 |
| FR | 736 930 A | 12/1932 |
| FR | 2 500 266 A | 8/1982 |
| GB | 2 219 961 | 12/1989 |

* cited by examiner

Primary Examiner—Timothy F. Simone
(74) Attorney, Agent, or Firm—Wenderoth, Lind & Ponack, L.L.P.

(57) ABSTRACT

This invention concerns a dough piece moulder comprising a dough piece sheeting station (20), a station transporting (14,16) sheeted dough pieces along an outgoing path, from the infeed (18) of the transproting station (14,16), located opposite the sheeting station (20) up to an intermediate point, through a station rolling (24) sheeted dough pieces and a return path, through a station shaping rolled dough pieces by elongating them, from the intermediate point up to the outlet of the transporting station located in the proximity of the infeed (18) and whereat the shaped dough pieces are delivered outside the moulder; a transfer station (46) arranged in the proximity of the intermediate point, actively transferring the rolled dough pieces from the outgoing path to the return path.

8 Claims, 4 Drawing Sheets

DOUGH LUMP SHAPER

The present invention relates to a dough lump shaper.

The invention relates more particularly to a dough lump shaper of the type comprising a dough lump rolling-out station, a station for conveying the rolled-out dough lumps along an outgoing path from the entrance of said conveying station, located facing the rolling-out station, as far as an intermediate point, through a station for rolling up the rolled-out dough lumps, and along a return path, by way of a station for shaping the rolled-up dough lumps by the elongation of the latter, from said intermediate point as far as the exit of the conveying station, which is located in proximity to said entrance and at which the shaped dough lumps are delivered at the exit of the shaper, and a movable-member transfer station arranged in the vicinity of the intermediate point and ensuring the active transfer of the rolled-up dough lumps from the outgoing path toward the return path.

Shapers of this type are known, in which a transfer station comprises two motorized transfer-belt conveyors extending in parallel and driven in rotation in the same direction of rotation.

The upper face of the first conveyor ensures the transfer of the dough lumps by way of the rolling-up station as far as the intermediate point, while its lower face cooperates with the upper face of the second conveyor which is driven in a movement in an opposite direction and at a lower speed, so as to ensure the shaping of the dough lumps and the travel of these as far as the exit of the shaper.

In order to maintain control over the dough lumps during their transfer from the first conveyor toward the second conveyor and, in particular, to prevent this transfer from taking place solely under the action of gravity, it was proposed to equip these shapers with a transfer station with a motorized movable member, said station being arranged downstream of the outgoing path and comprising an active surface facing toward the intermediate point and extending in the direction of a gap located between the first and second conveyors.

Such a shaper is described, for example, in the patent application FR 97 10 813.

The distance between this transfer station and the first conveyor and the distance between the two conveyors are set accurately as a function of the quantity of dough for each dough lump.

Before they are introduced into such a shaper or during this introduction, it is possible for two dough lumps to agglomerate so as to form only one. When such a double dough lump reaches the transfer station, its dimensions prevent it from passing through the space formed between the first conveyor and the transfer station and/or the space formed between the two conveyors.

The dough lump then becomes larger with the arrival of each new dough lump, thus making it necessary for the baker to take action in order to remove the dough.

Moreover, this type of malfunction causes soiling of the machine and gives rise to a loss of time due to cleaning.

The object of the invention is to overcome these disadvantages.

To achieve this, the subject of the invention is a shaper of the abovementioned type, characterized in that it comprises, furthermore, means for the ejection of dough lumps jammed in the vicinity of the intermediate point.

Thus, even when two dough lumps have agglomerated in the shaper, these are immediately ejected.

According to particular embodiments of the invention, the invention may comprise one or more of the following characteristics:

the means for the ejection of the jammed dough lumps comprise the transfer station;

the conveying station comprises a first motorized transfer-belt conveyor comprising first and second active faces opposite one another and movable in opposite directions, and a second motorized conveyor comprising an active face parallel to the second active face of the first conveyor and movable at a lower speed and in the opposite direction with respect to said second active face, said first active face of the first conveyor delimiting said outgoing path, and said second active face of the first conveyor and part of said active face of the second conveyor jointly ensuring the shaping and displacement of the rolled-up dough lumps along said return path, and the transfer station comprises a third motorized transfer-belt conveyor arranged downstream of the outgoing path and comprising an active surface facing toward the intermediate point and extending in the direction of a gap located between said first and second conveyors, a second part of said active face of the second conveyor and the third conveyor jointly ensuring the displacement of the jammed dough lumps along an ejection path;

the means for the ejection of jammed dough lumps comprise the active surface of the third conveyor and part of the active surface of the second conveyor, which are driven in the same direction;

the means for the ejection of the dough lumps comprise the second and third conveyors, and the active surface of the second conveyor forms a means for the transfer of the jammed dough lumps along the ejection path, while the third conveyor is stopped;

the shaper comprises means for detecting the jamming of a dough lump, said means controlling the means for the ejection of jammed dough lumps;

the movable-member transfer station is mounted on the frame so as to be displaceable in translational motion about a stable position of equilibrium for receiving the rolled-up dough lumps, a retracted position for the passage of dough lumps and an advanced position for pushing dough lumps, the means for detecting the jamming of a dough lump comprising means for detecting the position of equilibrium of the transfer station, which are connected to means for comparing the duration during which the transfer station is located outside the position of equilibrium with a threshold duration, in order to control the ejection means in the event that said threshold duration is exceeded; and the threshold duration is between 0.5 seconds and 2 seconds, preferably between 0.8 seconds and 1.5 seconds.

The invention will be understood more clearly from a reading of the following description given purely by way of example and made with reference to the accompanying drawings in which.

Figure 1:
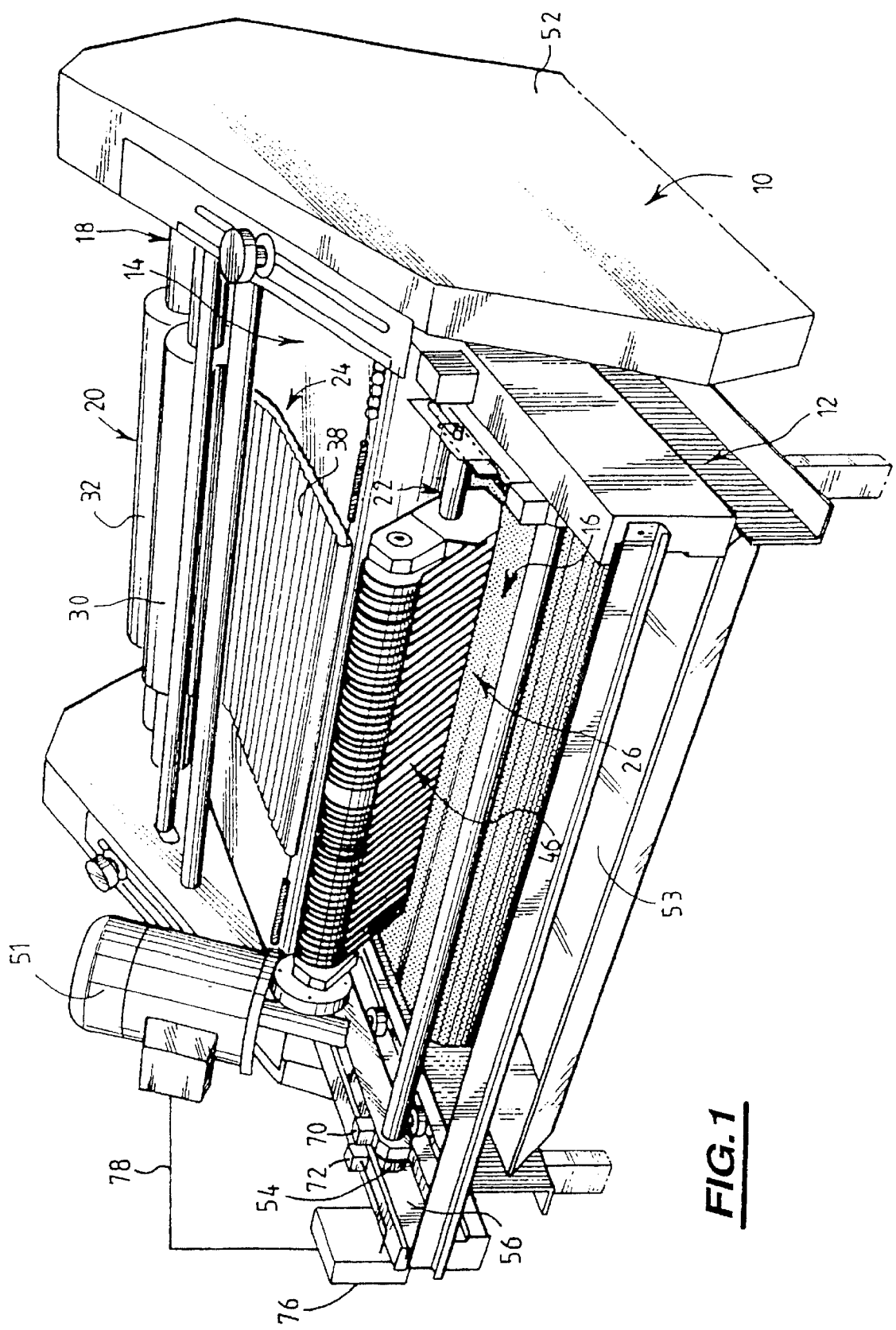
FIG. 1 shows a perspective view of a shaper according to the invention.
Figure 2:
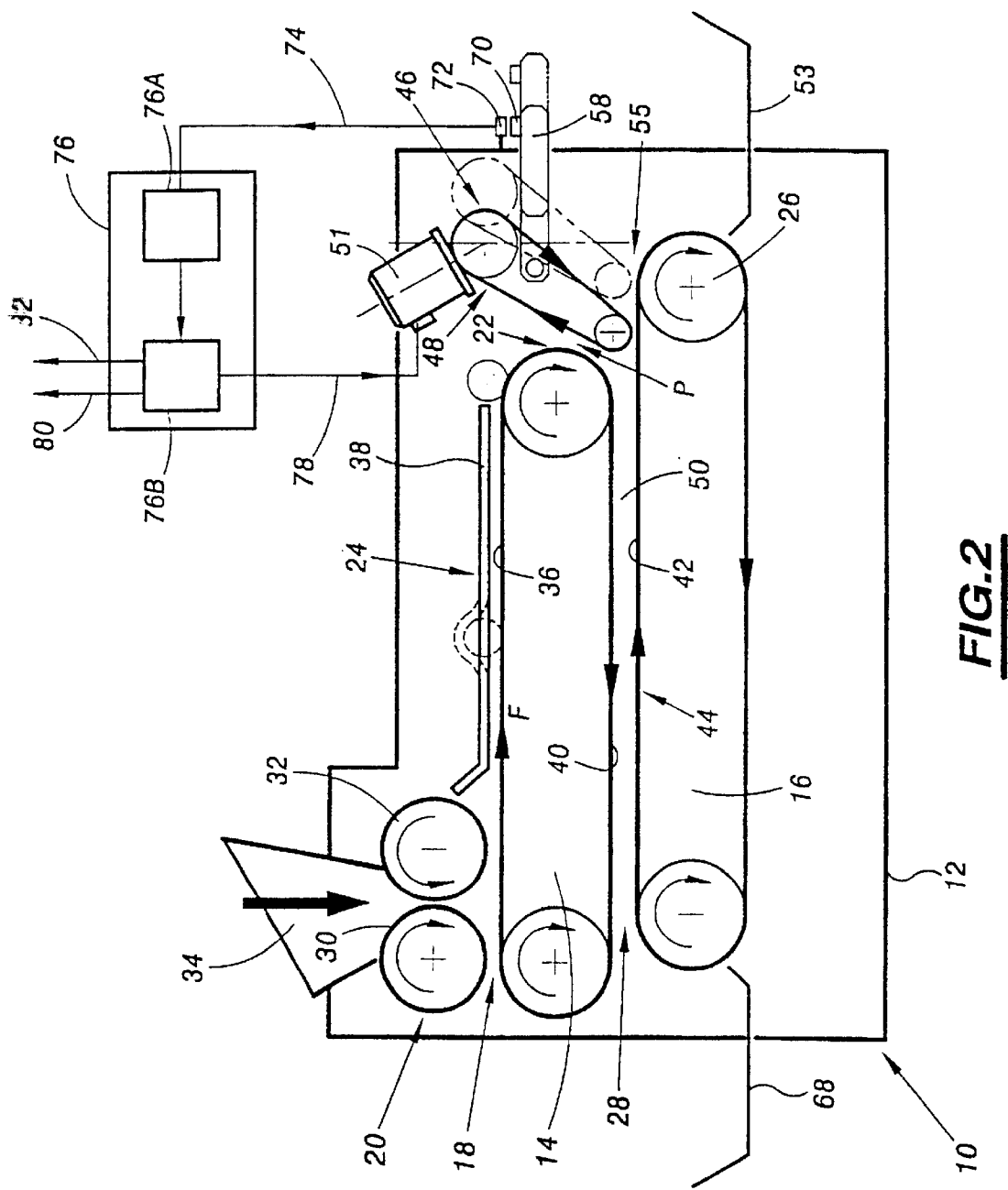
FIG. 2 shows a diagrammatic view according to a longitudinal section of the shaper of FIG. 1.

Referring to FIGS. 1 and 2, the dough lump shaper according to the invention, designated by the general reference numeral 10, comprises a frame 12 which is produced, for example, from metal beams and profiles and on which are mounted, one above the other, two motorized conveyors with a dough lump transporting belt, to be precise a first upper conveyor 14 and a second lower conveyor 16.

The two conveyors 14 and 16 jointly form a station for conveying dough lumps between the entrance of the latter, consisting of a first end 18 of the upper conveyor 14, said first end being located opposite a dough lump rolling-out station 20, and an intermediate point P, consisting of the opposite end 22 of this upper conveyor 14.

The conveying station conveys the dough lumps from the entrance toward the intermediate point P along an outgoing path, by way of a station 24 for rolling up the rolled-out dough lumps delivered by the rolling-out station 20, then, after the dough lumps have been transferred onto a first end 26 of the lower conveyor 16, along a return path from the intermediate point P as far as the exit of the conveying station, said exit consisting of the opposite end 28 of this lower conveyor 16, said opposite end being located in proximity to the entrance of the transfer station.

The rolling-out station 20 consists of the combination of two rolling-out cylinders 30 and 32 located opposite an entry hopper 34 (not shown in FIG. 1) making it possible to feed the shaper with dough.

The belt of the upper 14 and lower 16 conveyors travels in the same direction, represented by an arrow F in FIG. 2, the belt of the upper conveyor 14 being driven in a movement at a speed higher than that of the belt of the lower conveyor 16.

The first conveyor 14 comprises an upper active face 36 delimiting the outgoing path and cooperating with a fixed belt 38, with which it forms the dough lump rolling-up station 24. This belt 38 consists, for example, of a flexible plate produced from a material suitable for the use in question, for example from food-compatible stainless-steel wire. Jointly with the active upper face 36, it ensures the rolling-up of the rolled-out dough lumps, as is conventional.

Moreover, the upper conveyor 14 comprises a lower active face 40 extending parallel to the upper active face 36 and movable in the opposite direction with respect to the latter.

It cooperates with part of the upper active face 42 of the lower conveyor 16, in order to delimit the return path and form a station 44 for shaping the rolled-up dough lumps by the elongation of the latter.

To be precise, the upper active face 42 of this lower conveyor 16 extends substantially parallel to the lower active face 40 of the upper conveyor 14 and is movable in the opposite direction with respect to the latter.

Furthermore, these two active faces 40 and 42 converge slightly and, at the intermediate point P, are at a distance from one another corresponding substantially to the diameter of the rolled-up dough lumps delivered at the exit of the rolling-up station 24 and, at the exit 28 of the conveying station, are at a distance from one another corresponding to the diameter of the dough lumps to be obtained.

Moreover, as can be seen from FIGS. 1 and 2, the shaper comprises a station 46 for the transfer of rolled-up dough lumps, which, during normal operation, ensures the transfer of the dough lumps from the outgoing path toward the return path. The shaper comprises, furthermore, means for the ejection of double dough lumps jammed in the vicinity of the intermediate point P. These means for the ejection of dough lumps jammed in the shaper comprise the transfer station 46 and part of the upper active face 42 of the lower conveyor 16.

The transfer station 46 consists of a third belt conveyor arranged downstream of the outgoing path and comprising an active surface 48 facing toward the intermediate point P and extending in the direction of a gap 50 located between the upper 14 and lower 16 conveyors.

The third conveyor 46 is motorized under the action of drive means 51 and has two operating modes, to be precise a normal mode for the transfer of the dough lumps and an ejection mode taking action when a jammed dough lump is detected.

In the normal mode, it is driven at a speed lower than that of the conveyor 14 and higher than or equal to that of the lower conveyor 16, in such a way that the mutually facing surfaces of the first and third conveyors are driven in opposing movements for driving the rolled-up dough lumps in rotation and for transferring the latter as far as the gap 50.

In the ejection mode, it is driven in the opposite direction with respect to the direction of rotation in the normal mode, so as to drive the agglomerated and jammed dough lumps, jointly with the lower conveyor 16, by way of an ejection path 55 toward an ejection tray 53.

Alternatively, the third conveyor 46 is driven in the ejection mode in the same direction as the direction corresponding to the normal transfer mode, but at a speed lower than that of the lower conveyor 16. In this case, ejection is slowed down, but likewise takes place.

According to another variant, in the ejection mode the belt of the third conveyor is fixed and, where appropriate, the upper conveyor 14 is stopped or driven at a speed lower than that of the second conveyor 16, the latter causing the ejection of a jammed dough lump.

Figure 4:
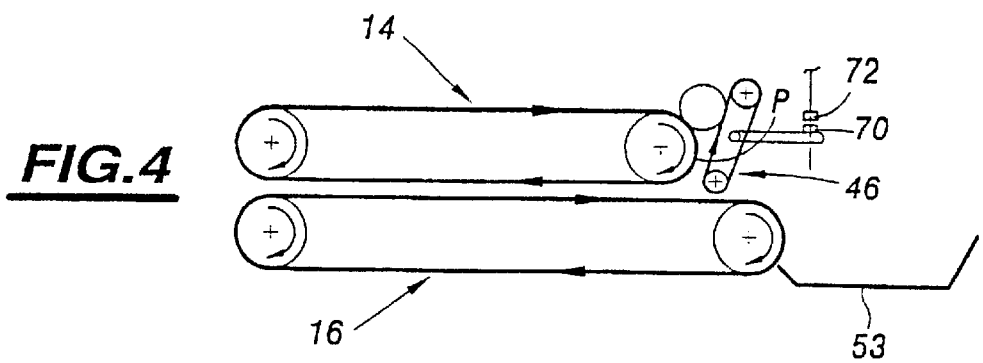
FIGS. 4 to 7 show part of the shaper of FIG. 2 during various phases of the ejection of a double dough lump.

The third conveyor 46 is mounted on the frame 12 so as to be displaceable in translational motion about a stable position of equilibrium for receiving the rolled-up dough lumps, said position being shown in FIGS. 2 and 4 and in which position the shortest distance between the mutually facing surfaces of the first 14 and third 46 conveyors is smaller than the diameter of the rolled-up dough lumps of normal size.

Figure 5:
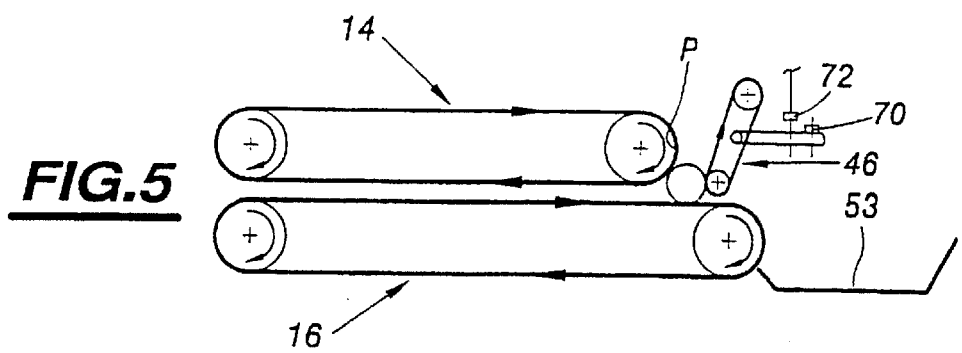

In particular, the third conveyor 46 is mounted on the frame 12 so as to be axially displaceable between a retracted position, shown in FIG. 5, allowing the rolled-up dough lumps to pass beyond the intermediate point P, and an advanced position for pushing the dough lumps between the first 14 and second 16 conveyors. For this purpose, as shown in FIGS. 1 and 3, the third conveyor 46 is provided with one or more transverse shafts 52 equipped at their opposite end with rollers 54 engaging in a complementary groove 56 for the guidance of this conveyor 46.

Figure 3:
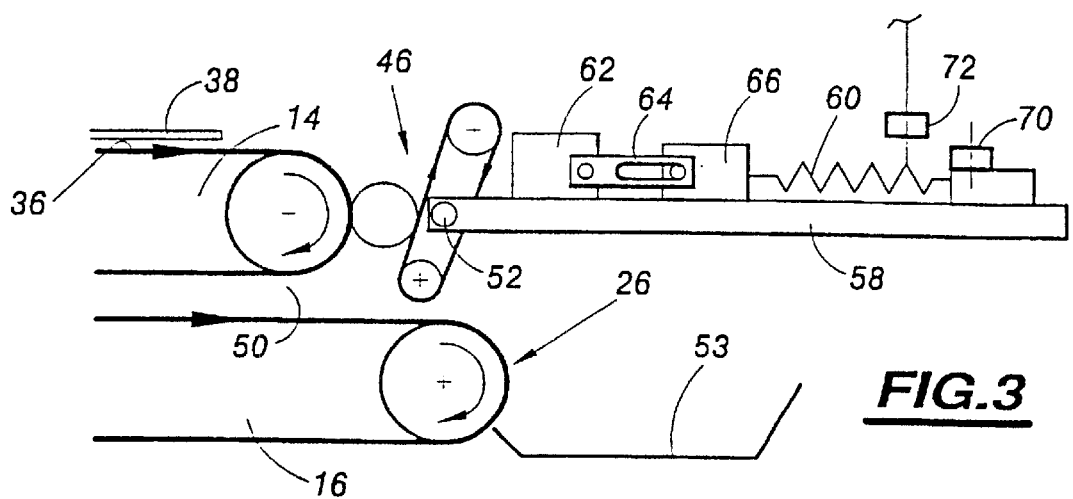
FIG. 3 shows an enlarged view of a detail of FIG. 2.

Moreover, as can be seen from FIG. 3, the transverse shaft 52 is connected with the aid of a longitudinal member 58 to a spring 60, itself connected to a fixed component 62 of the frame 12 by means of two components 64 and 66 sliding relative to one another.

The shaper comprises, furthermore, means 70, 72, 76 for detecting the jamming of a rolled-up dough lump at the third conveyor 46. These means 70, 72, 76 control the means for the ejection of jammed dough lumps.

These detection means comprise an indicator 70, a corresponding sensor 72 and a control device 76.

Referring once again to FIG. 2, it can be seen that the indicator 70 is carried by the upper face of the longitudinal member 58 and that the corresponding sensor 72 is carried by the frame 12.

The indicator 70 and the sensor 72 are arranged in such a way that the sensor can detect the position of equilibrium of the conveyor 46. In response to this detection, it transmits a corresponding detection signal to the control device 76, to which it is connected by means of an electrical connection 74. The control device 76 comprises a counting unit 76A which, when a corresponding signal is present on its input side for a predetermined time, supplies a signal at the output. The output of the counting unit 76A is connected to a setting unit 76B.

This setting unit 76B is connected to the drive means 51 by means of a second electrical connection 78 and is designed to set the speed and direction of conveyance of the conveyor 46 as a function of the signal supplied by the counting unit 76A.

Alternatively, the setting unit 76B may be provided with control lines 80, 82 which are connected to means for the motorization of the first and second conveyors 14, 16.

The shaper is completed by a tray for the recovery of shaped dough lumps, which is designated by the reference numeral 68 and is mounted on the frame 12, and by the means (not shown) for the motorization of the first 14 and second 16 conveyors.

It should be noted that, for example, the upper conveyor 14 is fastened to a box fixed relative to the frame 12 and that the second 16 and third 46 conveyors are fastened to one and the same movable and vertically adjustable box (not shown) which is carried by the frame 12, in such a way that the spacing between the first and second conveyors, on the one hand, and the first and third conveyors, on the other hand, is simultaneously adjustable as a function of the diameter of the dough lumps to be obtained.

The operation of this shaper in the normal mode and the ejection mode will now be described with reference to FIGS. 4 to 7.

The dough lumps, inserted in succession at the entrance of the shaper via the hopper 34, pass by way of the rolling-out station 20 and, at the exit of the latter, are delivered at the entrance of the conveying station, that is to say onto the active upper face 36 of the first conveyor 14.

The rolled-out dough lumps are subsequently driven under the action of said active upper face by way of the rolling-up station 24, at the exit of which they are in the form of a cylinder, as shown in FIG. 4.

It should be noted that, in this position, the third conveyor 46 of the shaper is located in its stable position of equilibrium. This position is detected by the sensor 72, and the corresponding detection signal emitted by the latter is transmitted to the control device 76. In response, the control device 76 controls the drive means 51 so as to drive the third conveyor 46 in the normal direction of rotation. The conveyor 46 is therefore driven clockwise in FIG. 4.

The rolled-up dough lumps are subsequently transferred in succession, at the intermediate point P, from the outgoing path toward the return path under the action of the third conveyor 46.

For this purpose, when the dough lump reaches the active surface 48 of the third conveyor 46, the latter, under the action of the dough lump, is displaced from its position of equilibrium toward its retracted position, counter to the spring 60, in order to allow the dough lump to pass beyond the intermediate point P, under the action of the difference in directions of rotation between the first 14 and third 46 conveyors and the higher speed of the first conveyor 14.

As soon as the third conveyor 46 is displaced out of its position of equilibrium, the sensor 72 supplies a corresponding signal to the counting unit 76A and the latter begins to count down the time during which the conveyor 46 is located out of this position.

If a normal dough lump is being transferred, the dough lump is pushed under the action of the restoring force of the spring 60 toward the gap 50 by the transfer station 46 and is subsequently driven between the two conveyors 14 and 16 under the action of the difference in speed between the latter.

After the passage of the dough lump, the transfer station 46 is returned to its position of equilibrium, and the sensor 72 once again signals this position to the counting unit 76A before a threshold duration preset in this unit is exceeded, that is to say a duration beyond which it is decided that a dough lump is jammed and, consequently, before said counting unit supplies the setting unit 76B with a signal of detection of the jamming of a dough lump.

The counter of the unit 76B is then reset to zero and the unit stops counting as soon as the third conveyor 46 resumes its position of equilibrium. In general, the threshold duration is between 0.5 seconds and 2 seconds, preferably between 0.8 seconds and 1.5 seconds. It depends on the production rate. In a typical situation, the transfer of a dough lump takes place in about one second and the threshold duration is between 1.2 seconds and 1.4 seconds.

If a double dough lump is being transferred, this dough lump is too large to be driven between the two conveyors 14 and 16 and the transfer station 46 then remains in its retracted position (FIG. 5).

In this case, the transfer belt 46 remains outside its position of equilibrium, that is to say in the retracted position, for a duration greater than the threshold duration (for example, between 1.2 and 1.4 seconds). The counting unit 76A establishes the jamming of an agglomerated dough lump by detecting that the threshold duration is exceeded and supplies a jamming signal to the setting unit 76B.

Figure 6:
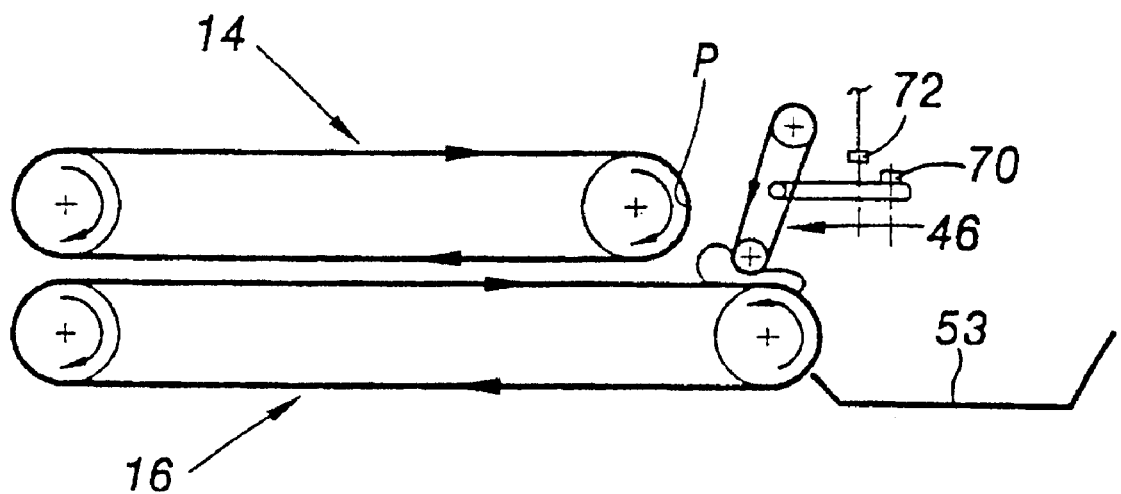

The setting unit 76B then controls the drive means 51 in order to drive the transfer belt 46 in the opposite direction (or, alternatively, stops the transfer belt 46), that is to say the active surfaces of the second and third conveyors are driven in the same direction. The agglomerated dough lump is then driven by the transfer belt 46 and the upper part 42 of the lower conveyor 16 through the space which is located between the second and third conveyors 16, 46 along the ejection path 55 toward the ejection tray 53 (FIG. 6).

Figure 7:
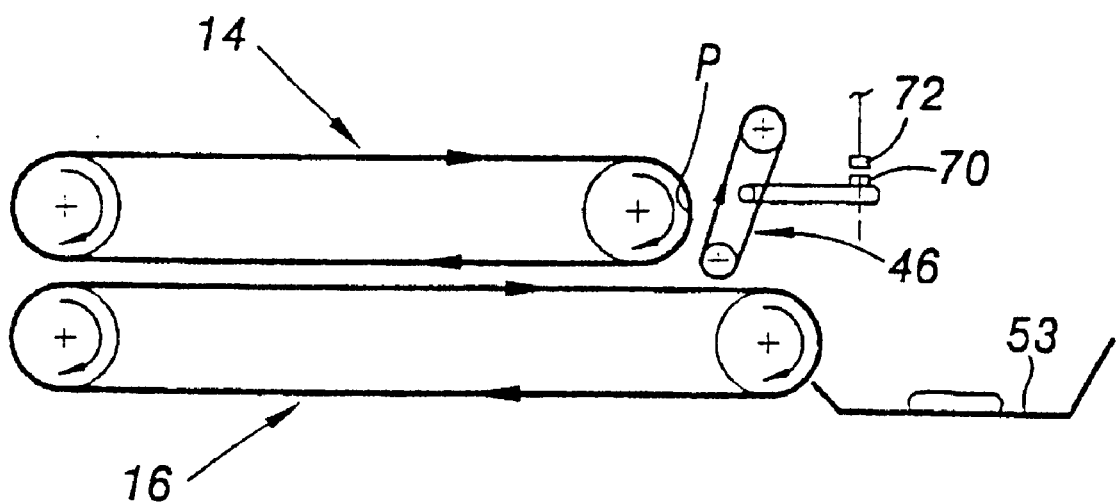

When the agglomerated dough lump is ejected, the transfer station 46 is released and can thus return to its position of equilibrium under the action of the spring 60 (FIG. 7). The sensor 72 then once again detects this position of equilibrium and the counting unit 76A resets the counter to zero and stops counting. The jamming signal is simultaneously stopped, thus 35 causing the conveyor 46 to be driven once again in the normal direction under the action of the setting unit 76B.

Alternatively, the control device 76 additionally controls the two upper and lower conveyors 14, 16 by the control of the lines 80, 82, in such a way that the rolling-up of dough lumps is stopped or slowed down when a jam occurs, until the latter is remedied.

For this purpose, the third conveyor 46 is driven in the normal direction of rotation, and, during a first phase, the double dough lump is driven through the space between the second and third conveyors under the action of this third conveyor 46 alone, if the first and second conveyors are stopped, or, if they are slowed down, by the second and third conveyors.

During a second phase, when the jam is eliminated, the dough lump is driven by the surface 42 of the second conveyor toward the ejection tray 53.

As mentioned above, according to another variant, for carrying out ejection the third conveyor is stopped. It from then on no longer performs its function of transferring dough lumps. The dough lumps are rejected toward the tray 53 under the action of the second conveyor 16.

It will be understood that the invention just described, which utilizes a transfer station capable of ejecting double dough lumps jammed in the shaper, makes it possible to increase considerably the availability and reliability of the shaper.

It will be understood, furthermore, that the production of the means for ejecting the jammed dough lumps is inexpensive and does not require many modifications of existing shapers.

We claim:

1. A dough lump shaper comprising, mounted on a frame (12), a dough lump rolling-out station (20), a station (14, 16) for conveying the rolled-out dough lumps along an outgoing path from the entrance (18) of said conveying station (14, 16), located facing the, rolling-out station (20), as far as an intermediate point (P), through a station (24) for rolling up the rolled-out dough lumps, and along a return path, by way of a station (44) for shaping the rolled-up dough lumps by the elongation of the latter, from said intermediate point (P) as far as the exit (28) of the conveying station, which is located in proximity to said entrance (18) and at which the shaped dough lumps are delivered at the exit of the shaper, and a movable-member transfer station (46) arranged in the vicinity of the intermediate point (P) and ensuring the active transfer of the rolled-up dough lumps from the outgoing path toward the return path, characterized in that it comprises means for the ejection of dough lumps jammed in the vicinity of the intermediate point.

2. The dough lump shaper as claimed in claim 1, characterized in that the means for the ejection of jammed dough lumps comprise the transfer station (46).

3. The shaper as claimed in claim 1, characterized in that the conveying station comprises a first motorized transfer-belt conveyor (14) comprising first and second active faces (36, 40) located opposite one another and movable in opposite directions, and a second motorized conveyor (16) comprising an active face (42) parallel to the second active face (40) of the first conveyor (14) and movable at a lower speed and in the opposite direction with respect to said second active face, said first active face (36) of the first conveyor (14) delimiting said outgoing path, and said second active face (40) of the first conveyor (14) and part of said active face (42) of the second conveyor jointly ensuring the shaping and displacement of the rolled-up dough lumps along said return path, and in that the transfer station comprises a third motorized transfer-belt conveyor (46) arranged downstream of the outgoing path and comprising an active surface (48) facing toward the intermediate point (P) and extending in the direction of a gap (50) located between said first and second conveyors, a second part of said active face (42) of the second conveyor and the third conveyor (46) jointly ensuring the displacement of the jammed dough lumps along an ejection path (55).

4. The shaper as claimed in claim 1, characterized in that the means for the ejection of jammed dough lumps comprise the active surface (48) of the third conveyor (46) and part of the active surface (42) of the second conveyor (16), which are driven in the same direction.

5. The shaper as claimed in claim 1, characterized in that the means for the ejection of dough lumps comprise the second (16) and third (46) conveyors, and in that the active surface (42) of the second conveyor (16) forms a means for the transfer of the jammed dough lumps along the ejection path, while the third conveyor (46) is stopped.

6. The shaper as claimed in claim 1, characterized in that the shaper comprises means for detecting the jamming of a dough lump, said means controlling the means for the ejection of jammed dough lumps.

7. The shaper as claimed in claim 1, characterized in that the movable-member transfer station (46) is mounted on the frame (12) so as to be displaceable in translational motion about a stable position of equilibrium for receiving the rolled-up dough lumps, a retracted position for the passage of dough lumps and an advanced position for pushing dough lumps, the means for detecting the jamming of a dough lump comprising means for detecting the position of equilibrium (70, 72) of the transfer station (46), which are connected to means (76B) for comparing the duration during which the transfer station (46) is located outside the position equilibrium with a threshold duration, in order to control the ejection means (46, 42) in the event that said threshold duration is exceeded.

8. The shaper as claimed in claim 1, characterized in that the threshold duration is between 0.5 seconds and 2 seconds, preferably between 0.8 seconds and 1.5 seconds.

\* \* \* \* \*